US010224561B2

(12) United States Patent
Ohashi

(10) Patent No.: US 10,224,561 B2
(45) Date of Patent: Mar. 5, 2019

(54) METHOD AND APPARATUS FOR PRODUCING MEMBRANE ELECTRODE ASSEMBLY

(71) Applicant: TOYOTA JIDOSHA KABUSHIKI KAISHA, Toyota-shi, Aichi-ken (JP)

(72) Inventor: Sozaburo Ohashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 410 days.

(21) Appl. No.: 14/957,897

(22) Filed: Dec. 3, 2015

(65) Prior Publication Data

US 2016/0172699 A1 Jun. 16, 2016

(30) Foreign Application Priority Data

Dec. 12, 2014 (JP) ................................. 2014-252148

(51) Int. Cl.
*H01M 8/1004* (2016.01)
*H01M 4/88* (2006.01)
*H01M 8/1018* (2016.01)

(52) U.S. Cl.
CPC ......... *H01M 8/1004* (2013.01); *H01M 4/881* (2013.01); *H01M 4/8814* (2013.01); *H01M 2008/1095* (2013.01); *Y02P 70/56* (2015.11)

(58) Field of Classification Search
CPC .. H01M 8/1004; H01M 4/881; H01M 4/8814; H01M 2008/1095; Y02P 70/56
See application file for complete search history.

(56) References Cited

U.S. PATENT DOCUMENTS

| | | | | |
|---|---|---|---|---|
| 6,998,149 | B2* | 2/2006 | Kohler | H01M 4/881 427/115 |
| 2010/0075188 | A1* | 3/2010 | Fukui | H01M 4/8803 429/483 |
| 2011/0097851 | A1 | 4/2011 | Sung-Dee Yim et al. | |
| 2012/0315571 | A1* | 12/2012 | Matsumura | H01M 8/1004 429/535 |
| 2013/0192750 | A1 | 8/2013 | Kiuchi | |

FOREIGN PATENT DOCUMENTS

| | | |
|---|---|---|
| JP | 2010-182563 | 8/2010 |
| JP | 2014-086324 A | 5/2014 |
| KR | 10-2011-0043908 A | 4/2011 |
| KR | 10-2013-0001264 A | 1/2013 |

* cited by examiner

*Primary Examiner* — Carson Gross
(74) *Attorney, Agent, or Firm* — Finnegan, Henderson, Farabow, Garrett & Dunner LLP

(57) ABSTRACT

A technique for producing a membrane electrode assembly with high quality is provided. In a method for producing a membrane electrode assembly, a first catalyst layer of a first catalyst layer sheet is bonded to a surface of an electrolyte film on which an electrolyte film base sheet is not formed. A first catalyst layer base sheet is separated from the first catalyst layer. The electrolyte film base sheet has been separated from the electrolyte film. A second catalyst layer of a second catalyst layer sheet is bonded to a surface of the electrolyte film from which the electrolyte film base sheet has been separated. The method for producing a membrane electrode assembly further includes a preliminary step of bonding either the second catalyst layer formed on the second catalyst layer base sheet or the second catalyst layer base sheet to a portion of the electrolyte film that has been fed prior to a position at which bonding of the first catalyst layer starts.

3 Claims, 3 Drawing Sheets

METHOD AND APPARATUS FOR
PRODUCING MEMBRANE ELECTRODE
ASSEMBLY

BACKGROUND OF THE INVENTION

Field of the Invention

The present invention relates to a method and an apparatus for producing a membrane electrode assembly.

Background Art

A solid polymer electrolyte fuel cell is an example of known fuel cells. The solid polymer electrolyte fuel cell includes, as its constituent, a membrane electrode assembly (MEA) in which a catalyst layer is formed on either surface of a solid polymer electrolyte film.

To produce a membrane electrode assembly by web handling, a first catalyst layer is bonded to one surface of a solid polymer electrolyte film unwound from a roll, and then a base for the solid polymer electrolyte film and a base for the first catalyst layer are separated from each other. Thereafter, a second catalyst layer is bonded to the other surface of the solid polymer electrolyte film. Patent Document 1 discloses a method for producing a membrane electrode assembly.

CITATION LIST

Patent Document

[Patent Document 1] JP2010-182563 A

SUMMARY OF THE INVENTION

In the known method for producing a membrane electrode assembly described above, when a member comes to include only the solid polymer electrolyte film and the first catalyst layer by separation between the base for the solid polymer electrolyte film and the base for the first catalyst layer, the solid polymer electrolyte film might shrink by heat so that a tensile stress occurs and the solid polymer electrolyte film is curved in some cases. If the second catalyst layer is to be bonded to the curved solid polymer electrolyte film, the second catalyst layer cannot be appropriately bonded, leading to the possibility of a degraded quality of the resulting membrane electrode assembly.

The present invention has been made in view of the foregoing. An object of the present invention is to provide a technique for producing a membrane electrode assembly with high quality.

A method for producing a membrane electrode assembly according to the present invention includes: a feeding step of feeding an electrolyte film sheet including an electrolyte film base sheet and an electrolyte film formed on the electrolyte film base sheet, a first catalyst layer sheet including a first catalyst layer base sheet and a first catalyst layer formed on the first catalyst layer base sheet, and second catalyst layer sheet including a second catalyst layer base sheet and a second catalyst layer formed on the second catalyst layer base sheet; a first bonding step of bonding the first catalyst layer of the first catalyst layer sheet to a surface of the electrolyte film on which the electrolyte film base sheet is not formed; a first separation step of separating the first catalyst layer base sheet from the first catalyst layer; a second separation step of separating the electrolyte film base sheet from the electrolyte film; a second bonding step of bonding the second catalyst layer of the second catalyst layer sheet to a surface of the electrolyte film from which the electrolyte film base sheet has been separated; and a preliminary step of bonding either the second catalyst layer formed on the second catalyst layer base sheet or the second catalyst layer base sheet to a portion of the electrolyte film that has been fed prior to a position at which the bonding of the first catalyst layer starts in the first bonding step.

An apparatus for producing a membrane electrode assembly according to the present invention includes: an electrolyte film sheet feeder configured to feed an electrolyte film sheet including an electrolyte film base sheet and an electrolyte film located on the electrolyte film base sheet; a first catalyst layer sheet feeder configured to feed a first catalyst layer sheet including a first catalyst layer base sheet and a first catalyst layer located on the first catalyst layer base sheet; a second catalyst layer sheet feeder configured to feed a second catalyst layer sheet including a second catalyst layer base sheet and a second catalyst layer located on the second catalyst layer base sheet; a first bonding unit configured to bond the first catalyst layer of the first catalyst layer sheet to a surface of the electrolyte film on which the electrolyte film base sheet is not located; a first separating unit configured to remove the first catalyst layer base sheet from the first catalyst layer; a second separating unit configured to remove the electrolyte film base sheet from the electrolyte film; and a second bonding unit configured to bond the second catalyst layer of the second catalyst layer sheet to a surface of the electrolyte film from which the electrolyte film base sheet has been separated, wherein the second bonding unit is capable of bonding either the second catalyst layer located on the second catalyst layer base sheet or the second catalyst layer base sheet to a portion of the electrolyte film that has been fed prior to a position at which bonding of the first catalyst layer by the first bonding unit starts as a preliminary process.

The present invention provides a technique for producing a membrane electrode assembly with high quality.

DESCRIPTION OF THE PREFERRED EMBODIMENTS

An embodiment of the present invention will be described hereinafter with reference to the drawings. Note that the scope of the invention is not limited to the following embodiment.

[Configuration of Production Apparatus]

Figure 1:
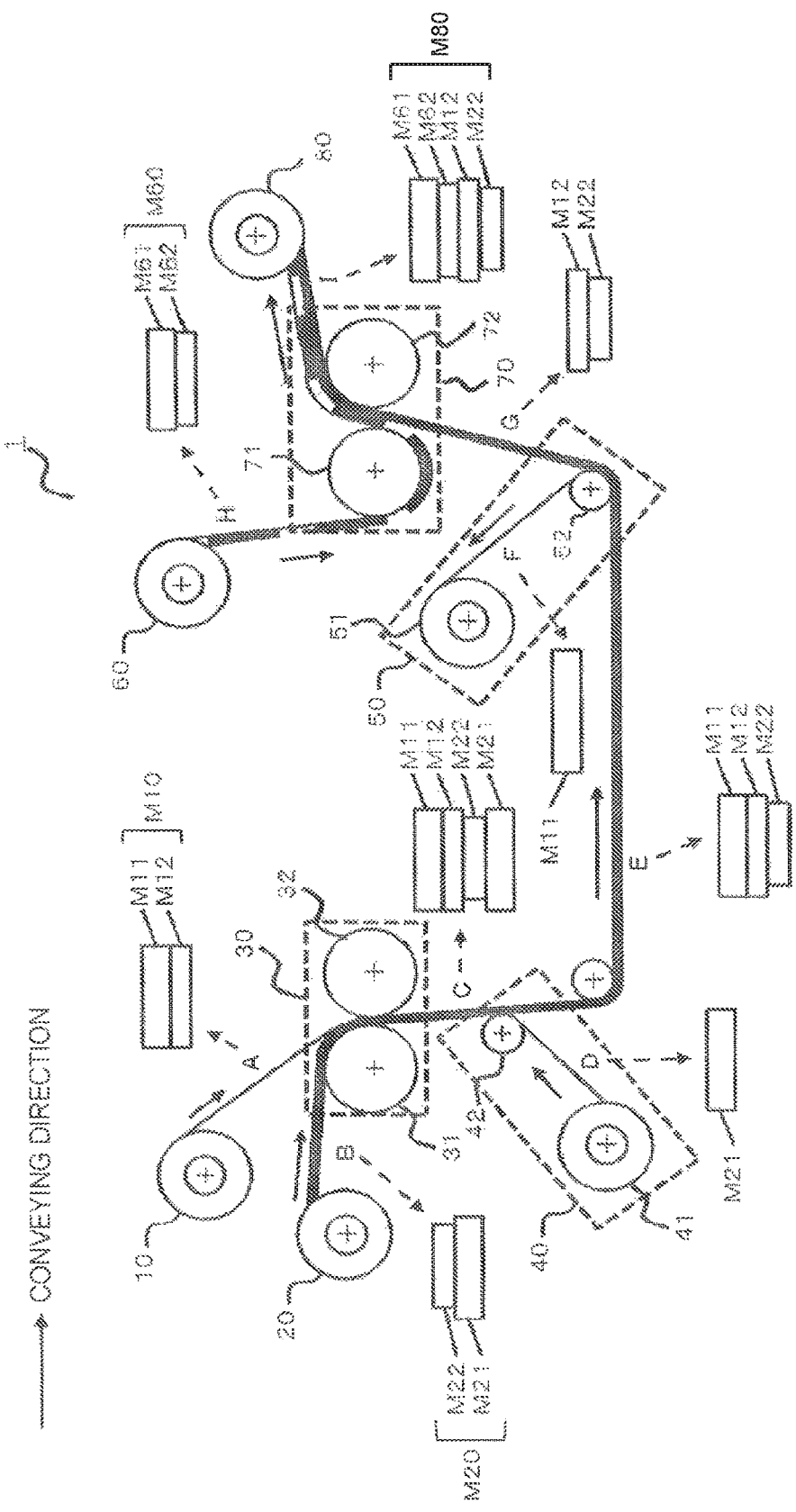
FIG. 1 schematically illustrates a configuration of an apparatus for producing a membrane electrode assembly according to an embodiment.

Referring to FIG. 1, a configuration of an apparatus for producing a membrane electrode assembly by web handling according to an embodiment will be described. As illustrated in FIG. 1, a production apparatus 1 includes an electrolyte film sheet feeder 10, a first catalyst layer sheet feeder 20, a first bonding unit 30, a first separating unit 40, a second separating unit 50, a second catalyst layer sheet feeder 60, a second bonding unit 70, and a winder 80. FIG. 1 illustrates cross sections of members that are conveyed in the production apparatus 1 from conveying position A to conveying position I. Each of these cross sections is taken along a plane perpendicular to the conveying direction of the members. The same holds for other cross sections in other drawings.

The electrolyte film sheet feeder 10 holds a rolled band-shaped electrolyte film sheet M10 and feeds (unwinds) the electrolyte film sheet M10. The electrolyte film sheet M10 is a sheet in which an electrolyte film M12 is formed on one surface of a band-shaped electrolyte film base sheet M11. The electrolyte film M12 is made of a solid polymer electrolyte material showing an excellent proton conductivity in a wet state. The solid polymer electrolyte material may be a fluorine-based resin (e.g., Nafion, produced by DuPont) including perfluoro carbon sulfonic acid, for example. The electrolyte film base sheet M11 is, for example, a polymer film of polyester, such as polyethylene terephthalate (PET) or polyethylene naphthalate (PEN), or polystyrene, for example.

The first catalyst layer sheet feeder 20 holds a rolled band-shaped first catalyst layer sheet M20 and feeds the first catalyst layer sheet M20. The first catalyst layer sheet M20 is a sheet in which a first catalyst layer M22 is formed on one surface of a band-shaped first catalyst layer base sheet M21. The first catalyst layer M22 is an anode catalyst layer in this embodiment. For example, the first catalyst layer M22 can be formed by using, as a catalyst for promoting power generation reaction, a catalyst layer material including carbon particles loaded with platinum or a platinum alloy and electrolyte. The first catalyst layer base sheet M21 is, for example, a polymer film of polyester, such as polyethylene terephthalate (PET) or polyethylene naphthalate (PEN), or polystyrene, for example.

The first bonding unit 30 includes bonding rollers 31 and 32. The first bonding unit 30 coveys the electrolyte film sheet M10 fed from the electrolyte film sheet feeder 10 and the first catalyst layer sheet M20 fed from the first catalyst layer sheet feeder 20 while sandwiching these sheets with nip parts of the rotating bonding rollers 31 and 32. At this time, in the nip parts of the bonding rollers 31 and 32, a surface of the first catalyst layer M22 on which the first catalyst layer base sheet M21 is not formed in the first catalyst layer sheet M20 is stacked on a surface of the electrolyte film M12 on which the electrolyte film base sheet M11 is not formed in the electrolyte film sheet M10, thereby bonding the first catalyst layer M22 to the electrolyte film M12.

The first separating unit 40 includes a winder 41 and a separating roller 42. The first separating unit 40 removes and unwinds the first catalyst layer base sheet M21 from the first catalyst layer M22 bonded to the electrolyte film M12 and conveyed from the first bonding unit 30. Specifically, in the first separating unit 40, the first catalyst layer base sheet M21 is separated from the first catalyst layer M22 by the separating roller 42, and the separated first catalyst layer base sheet M21 is wound by the winder 41.

The second separating unit 50 includes a winder 51 and a separating roller 52. The second separating unit 50 removes and unwinds the electrolyte film base sheet M11 from the electrolyte film M12 bonded to the first catalyst layer M22 and conveyed from the first separating unit 40. Specifically, in the second separating unit 50, the electrolyte film base sheet M11 is separated from the electrolyte film M12 by the separating roller 52, and the separated electrolyte film base sheet M11 is wound by the winder 51.

The second catalyst layer sheet feeder 60 holds a rolled band-shaped second catalyst layer sheet M60 and feeds the second catalyst layer sheet M60. The second catalyst layer sheet M60 is a sheet in which a second catalyst layer M62 is formed on one surface of a band-shaped second catalyst layer base sheet M61. The second catalyst layer M62 is a cathode catalyst layer in this embodiment. The second catalyst layer M62 is composed of a plurality of catalyst layers intermittently arranged at regular intervals. The second catalyst layer base sheet M61 is, for example, a polymer film of polyester such as PET or PEN or polystyrene, for example.

In this embodiment, the first catalyst layer M22 is the anode catalyst layer, and the second catalyst layer M62 is the cathode catalyst layer. However, the present invention is not limited to this example. The first catalyst layer M22 may be a cathode catalyst layer, and the second catalyst layer M62 may be an anode catalyst layer.

The second bonding unit 70 includes bonding rollers 71 and 72. The second bonding unit 70 conveys the electrolyte film M12 and the first catalyst layer M22 conveyed from the second separating unit 50 and the second catalyst layer sheet M60 fed from the second catalyst layer sheet feeder 60 while sandwiching these sheets with nip parts of the bonding rollers 71 and 72. At this time, in the nip parts of the bonding rollers 71 and 72, a surface of the second catalyst layer M62 on which the second catalyst layer base sheet M61 is not formed in the second catalyst layer sheet M60 is stacked on a surface of the electrolyte film M12 from which the electrolyte film base sheet M11 has been separated, thereby bonding the second catalyst layer M62 to the electrolyte film M12. Consequently, a membrane electrode assembly M80 in which the first catalyst layer M22 and the second catalyst layer M62 are bonded to the electrolyte film M12. At this time, the second catalyst layer base sheet M61 remains on the second catalyst layer M62 of the membrane electrode assembly M80.

The winder 80 winds the membrane electrode assembly M80 formed and conveyed by the second bonding unit 70. In this manner, the membrane electrode assembly M80 including the second catalyst layer base sheet M61 is wound by the winder 80. The membrane electrode assembly M80 is very thin (e.g., 20 microns), and thus, is readily deformed (e.g., curved) or damaged. The presence of the second catalyst layer base sheet M61 formed on the second catalyst layer M62 of the membrane electrode assembly M80 can reduce winding of the curved membrane electrode assembly M80 and creases and/or cracks formed in the membrane electrode assembly M80.

[Process Steps of Production Start]

Next, process steps including a preliminary step for starting production of the membrane electrode assembly M80 in the production apparatus 1 by web handling will be described.

In production of the membrane electrode assembly M80 described above, a member conveyed from the second separating unit 50 includes only the electrolyte film M12 and the first catalyst layer M22 and does not include a base. Thus, the electrolyte film M12 might shrink by heat to cause a tensile stress between the second separating unit 50 and the second bonding unit 70 in the production apparatus 1 and, consequently, the electrolyte film M12 might be curved in some cases. Process steps including the preliminary step for starting production of the membrane electrode assembly M80 described below are performed in order to prevent such curving.

In a manner similar to the process steps of producing the membrane electrode assembly M80 described above, in the preliminary step before production of the membrane electrode assembly M80, the electrolyte film sheet M10 is fed from the electrolyte film sheet feeder 10.

In the preliminary step, instead of the first catalyst layer sheet M20, a film is fed from the first catalyst layer sheet feeder 20 by a predetermined length, and then, the first catalyst layer sheet M20 is fed. The film may be made of any material, e.g., polymer such as polyethylene terephthalate (PET) or polytetrafluoroethylene (PTFE). The film fed from the first catalyst layer sheet feeder 20 is wound by the first separating unit 40.

In the preliminary step, instead of the second catalyst layer sheet M60, the second catalyst layer base sheet M61 is fed from the second catalyst layer sheet feeder 60 by a predetermined length, and then, the second catalyst layer sheet M60 is fed.

Figure 2:
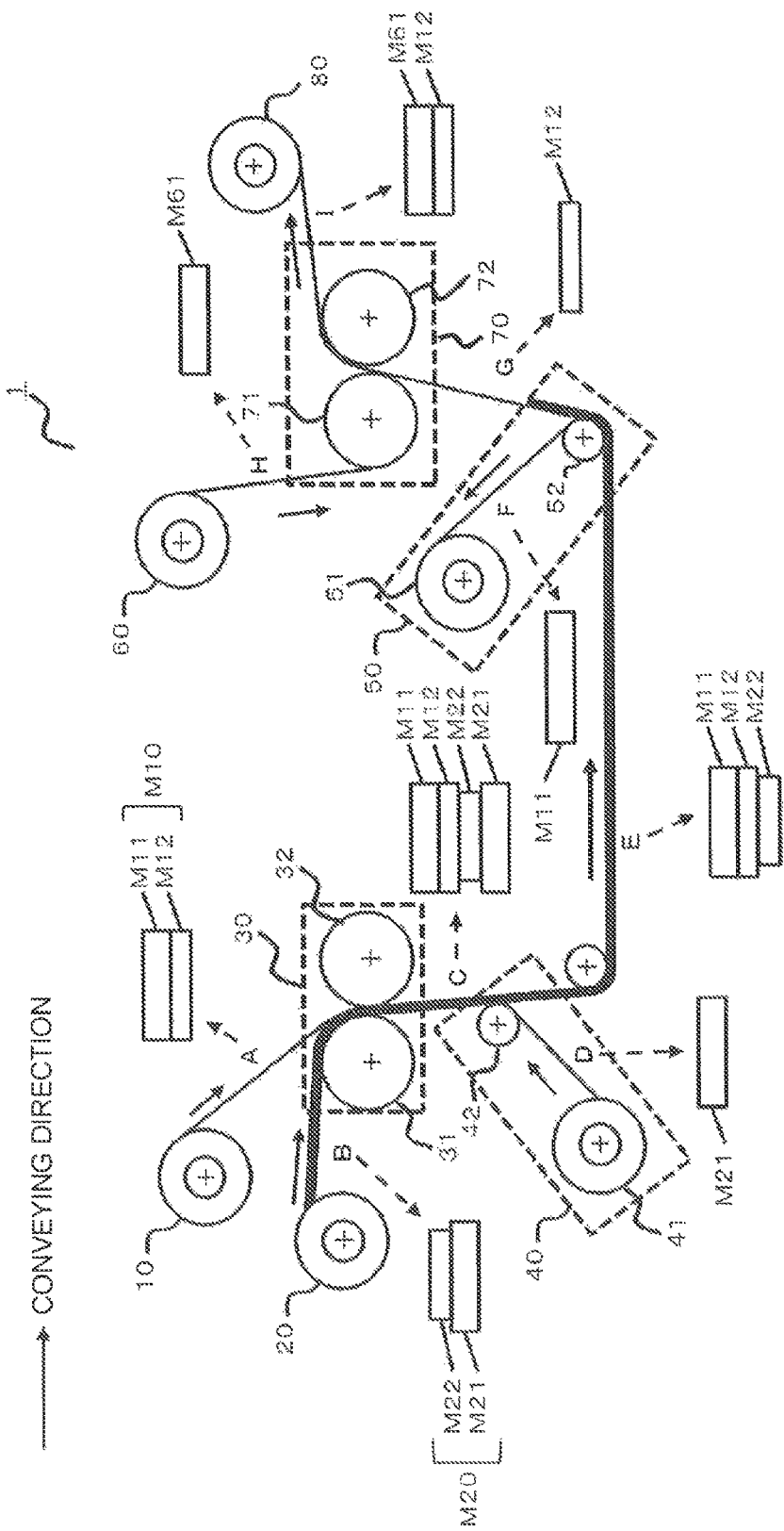
FIG. 2 is a view for describing a preliminary step in a method for producing a membrane electrode assembly according to an embodiment.

Referring to FIG. 2, a bonding step that is initially performed by the second bonding unit 70 in the preliminary step will be described. As illustrated in FIG. 2, only the electrolyte film M12 is conveyed at position G. That is, as described above, in the preliminary step, the film is fed from the first catalyst layer sheet feeder 20 by a predetermined length instead of the first catalyst layer sheet M20, and then, the first catalyst layer sheet M20 is fed. Thus, the first catalyst layer M22 is not formed on the electrolyte film M12 conveyed to position G in an initial stage of the preliminary step. Accordingly, at position G, no difference in tensile strength arises between the electrolyte film M12 and the first catalyst layer M22, and thus, no curving of the electrolyte film M12 due to the tensile strength occurs.

At position H in FIG. 2, only the second catalyst layer base sheet M61 is conveyed. That is, as described above, in the preliminary step, the second catalyst layer base sheet M61 is fed from the second catalyst layer sheet feeder 60 by a predetermined length instead of the second catalyst layer sheet M60. Accordingly, the second catalyst layer M62 is not formed on the second catalyst layer base sheet M61 conveyed to position H in the initial stage of the preliminary step.

In the second bonding unit 70, the electrolyte film M12 conveyed from the second separating unit 50 and the second catalyst layer base sheet M61 conveyed from the second catalyst layer sheet feeder 60 are bonded together. That is, in the second bonding unit 70, the second catalyst layer base sheet M61 is bonded to a portion of the electrolyte film M12 that is fed (conveyed) prior to a position at which bonding of the first catalyst layer M22 by the first bonding unit 30 starts. The cross section of the member that is being conveyed after the bonding is shown as a cross section at position I in FIG. 2.

Figure 3:
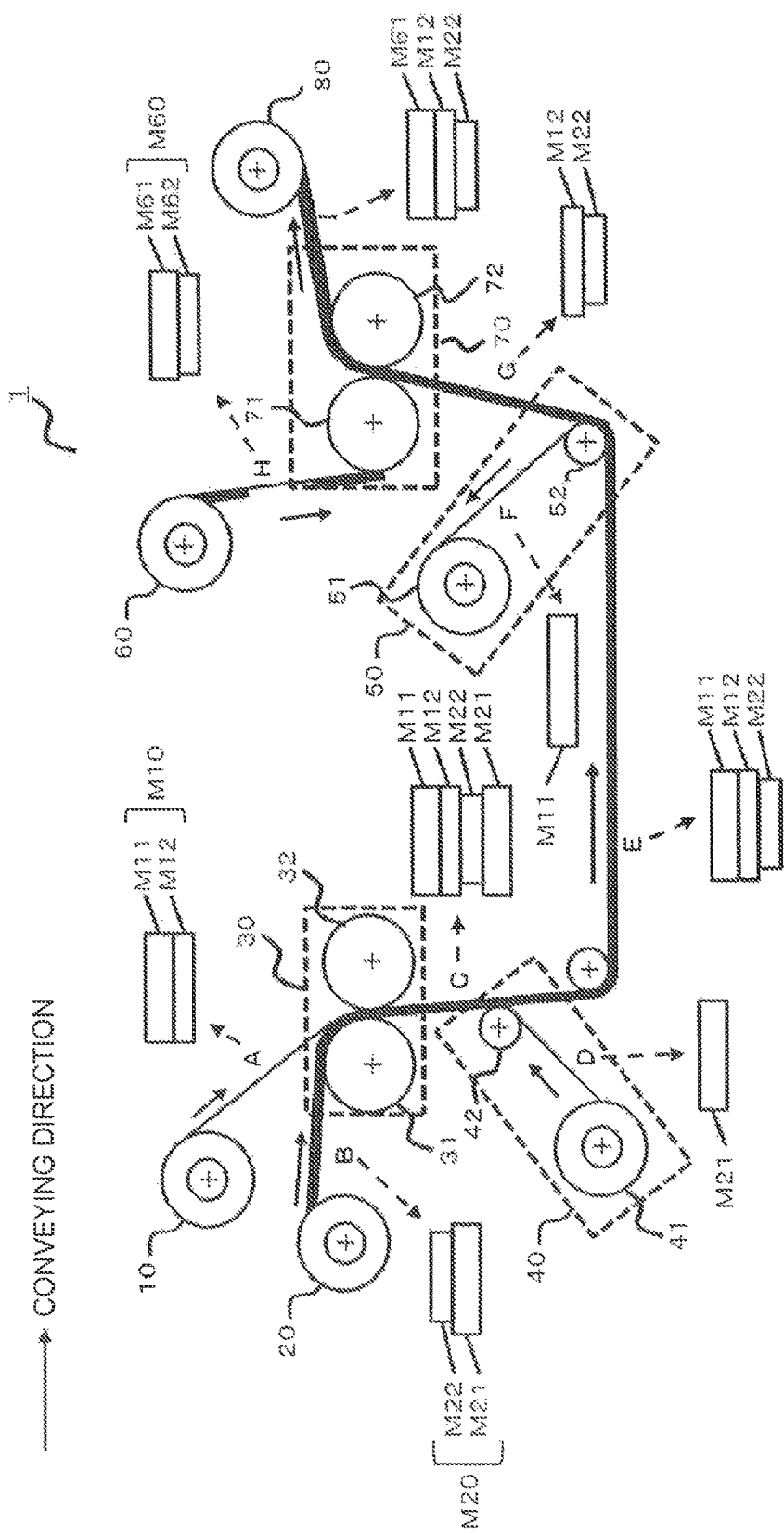
FIG. 3 is a view for describing the preliminary step in the method for producing a membrane electrode assembly of the embodiment.

Thereafter, as illustrated in FIG. 3, the member from which the electrolyte film base sheet M11 has been separated and in which the electrolyte film M12 and the first catalyst layer M22 are bonded together is conveyed from the second separating unit 50. In the second bonding unit 70, the second catalyst layer base sheet M61 conveyed from the second catalyst layer sheet feeder 60 is bonded to the electrolyte film M12 conveyed from the second separating unit 50 and a surface (a surface from which the electrolyte film base sheet M11 has been separated) of the electrolyte film M12 in the first catalyst layer M22. The cross section of the member that is being conveyed after the bonding is shown as a cross section at position I in FIG. 3.

Subsequently, the second catalyst layer sheet M60 fed from the second catalyst layer sheet feeder 60 is conveyed to the second bonding unit 70, and bonded to the electrolyte film M12 and the first catalyst layer M22 from the second separating unit 50, thereby performing production of the membrane electrode assembly M80 described with reference to FIG. 1.

As described above, in this embodiment, from the preliminary step to start of production of the membrane electrode assembly M80, the second bonding unit 70 performs the following process steps. Specifically, first, the second bonding unit 70 bonds the second catalyst layer base sheet M61 to a portion (i.e., a portion that has been conveyed prior to a position at which bonding of the first catalyst layer M22 by the first bonding unit 30 starts) of the electrolyte film M12 conveyed from the second separating unit 50 (see a cross section at position I in FIG. 2).

Next, in the second bonding unit 70, the second catalyst layer base sheet M61 conveyed from the second catalyst layer sheet feeder 60 is bonded to the electrolyte film M12 conveyed from the second separating unit 50 and a surface (i.e., a surface from which the electrolyte film base sheet M11 has been separated) of the electrolyte film M12 in the first catalyst layer M22 (see a cross section at position I in FIG. 3). That is, the above-described film fed from the first catalyst layer sheet feeder 20 by the "predetermined length" and the second catalyst layer base sheet M61 fed from the second catalyst layer sheet feeder 60 by the "predetermined length" are adjusted such that the film and the sheet can be bonded in the second bonding unit 70 as described with reference to FIG. 3.

Thereafter, as described with reference to FIG. 1, the second bonding unit 70 bonds the second catalyst layer M62 to a surface (i.e., a surface of the electrolyte film M12 to which the first catalyst layer M22 is not bonded) of the electrolyte film M12 from which the electrolyte film base sheet M11 has been separated, and the resulting membrane electrode assembly M80 is conveyed (see a cross section at position I in FIG. 1).

In this manner, in the this embodiment, in production of the membrane electrode assembly M80, the second bonding unit 70 performs the preliminary step of bonding the second catalyst layer base sheet M61 to a portion (i.e., a portion that has been conveyed prior to a position at which bonding of the first catalyst layer M22 by the first bonding unit 30 starts) of the electrolyte film M12 conveyed from the second separating unit 50. As a result, possible curving of the electrolyte film M12 and the first catalyst layer M22 due to a difference in tensile strength between the electrolyte film M12 and the first catalyst layer M22 can be reduced (or corrected) for the following reasons.

Specifically, in the second bonding unit 70, the second catalyst layer base sheet M61 is bonded to a portion of the electrolyte film M12 to which the first catalyst layer M22 is not bonded so that a restraining force to the electrolyte film M12 by the second catalyst layer base sheet M61 occurs in this portion. Once such a restraining force occurs, this restraining force continuously acts thereafter. Thus, even if the electrolyte film M12 and the first catalyst layer M22 were conveyed to the second bonding unit 70 with occurrence of curving, the restraining force that has already occurred in the second bonding unit 70 would correct the curving. As a result, the membrane electrode assembly M80 with high quality can be produced.

If bonding of the second catalyst layer base sheet M61 starts from a portion of the electrolyte film M12 to which the first catalyst layer M22 is already bonded and in which curving occurs in the second bonding unit 70 without performing the preliminary step, this curving cannot be corrected. This is because the curved electrolyte film M12 has been already conveyed to the second bonding unit 70 before the restraining force on the electrolyte film M12 is generated by the second catalyst layer base sheet M61 in the second bonding unit 70.

[Variations]

As described with reference to FIG. 2, in the preliminary step of the embodiment, the second bonding unit 70 bonds the second catalyst layer base sheet M61 to the portion of the electrolyte film M12 that has been fed (conveyed) prior to a position at which bonding of the first catalyst layer M22 by the first bonding unit 30 starts.

However, the present invention is not limited to this method. Alternatively, the second bonding unit 70 may bond the second catalyst layer M62 (i.e., the second catalyst layer M62 of the second catalyst layer sheet M60) formed on the second catalyst layer base sheet M61 to a portion of the electrolyte film M12 that has been conveyed prior to the position at which the bonding of the first catalyst layer M22 by the first bonding unit 30 starts. In this manner, a restraining force on the electrolyte film M12 can also be generated in the second bonding unit 70 by bonding the second catalyst layer M62 of the second catalyst layer sheet M60 instead of the second catalyst layer base sheet M61.

To reduce occurrence of curving of the electrolyte film M12, a tape may be bonded to a portion of the electrolyte film M12 at which bonding of the first catalyst layer M22 by the first bonding unit 30 starts. Examples of such a tape include a tape (e.g., a Kapton (registered trademark) tape) made of a material having a high thermal resistance and a high flame resistance. The portion of the electrolyte film M12 to which the tape is attached is not curved because of the presence of the tape. Thus, the second bonding unit 70 can bond the second catalyst layer M62 to the portion of the electrolyte film M12 to which the tape is bonded in a state where no curving occurs. As a result, it is possible to bond the second catalyst layer M62 while correcting curving of the electrolyte film M12 in a subsequent process step.

DESCRIPTION OF REFERENCE SIGNS 1 production apparatus
10 electrolyte film sheet feeder
20 first catalyst layer sheet feeder
30 first bonding unit
40 first separating unit
50 second separating unit
60 second catalyst layer sheet feeder
70 second bonding unit
80 winder
M10 electrolyte film sheet
M11 electrolyte film base sheet
M12 electrolyte film
M20 first catalyst layer sheet
M21 first catalyst layer base sheet
M22 first catalyst layer
M60 second catalyst layer sheet
M61 second catalyst layer base sheet
M62 second catalyst layer

What is claimed is:

1. A method for producing a membrane electrode assembly, the method comprising:
   a feeding step of feeding an electrolyte film sheet including an electrolyte film base sheet and an electrolyte film formed on the electrolyte film base sheet, a first catalyst layer sheet including a first catalyst layer base sheet and a first catalyst layer formed on the first catalyst layer base sheet, and second catalyst layer sheet including a second catalyst layer base sheet and a second catalyst layer formed on the second catalyst layer base sheet;
   a first bonding step of bonding the first catalyst layer of the first catalyst layer sheet to a surface of the electrolyte film on which the electrolyte film base sheet is not formed;
   a first separation step of separating the first catalyst layer base sheet from the first catalyst layer;
   a second separation step of separating the electrolyte film base sheet from the electrolyte film; and
   a second bonding step of bonding the second catalyst layer of the second catalyst layer sheet to a surface of the electrolyte film from which the electrolyte film base sheet has been separated,
   wherein the method further comprising a preliminary step of bonding either the second catalyst layer formed on the second catalyst layer base sheet or the second catalyst layer base sheet to a portion of the electrolyte film that has been fed prior to a position at which the bonding of the first catalyst layer starts in the first bonding step.

2. The method for producing a membrane electrode assembly according to claim 1, wherein
   in the preliminary step, the second catalyst layer base sheet is bonded to a surface of the electrolyte film from which the electrolyte film base sheet has been separated.

3. The method for producing a membrane electrode assembly according to claim 1, further comprising
   a winding step of winding the electrolyte film to which the first catalyst layer and the second catalyst layer formed on the second catalyst layer base sheet are bonded.

* * * * *